United States Patent
Selim et al.

(10) Patent No.: US 12,222,106 B2
(45) Date of Patent: Feb. 11, 2025

(54) AMMONIA FIRED COMBUSTOR OPERATING METHOD

(71) Applicant: General Electric Company, Schenectady, NY (US)

(72) Inventors: Hatem M. Selim, Dammam (SA); Baha Suleiman, Dammam (SA); Majed Sammak, Dammam (SA); Michael John Hughes, State College, PA (US); Abdurrahman Abdallah Khalidi, Dubai (AE); Alaaeldin Elsaeed Dawood, Dammam (SA)

(73) Assignee: GE Infrastructure Technology LLC, Greenville, SC (US)

( * ) Notice: Subject to any disclaimer, the term of this patent is extended or adjusted under 35 U.S.C. 154(b) by 66 days.

(21) Appl. No.: 17/708,860

(22) Filed: Mar. 30, 2022

(65) Prior Publication Data
US 2023/0313995 A1 Oct. 5, 2023

(51) Int. Cl.
*F23R 3/34* (2006.01)
*F02C 3/22* (2006.01)
(Continued)

(52) U.S. Cl.
CPC .............. *F23R 3/346* (2013.01); *F02C 3/22* (2013.01); *F02C 3/30* (2013.01); *F23R 3/36* (2013.01);
(Continued)

(58) Field of Classification Search
CPC .... F23R 3/34; F23R 3/346; F02C 3/20; F02C 3/22; F02C 3/30
See application file for complete search history.

(56) References Cited

U.S. PATENT DOCUMENTS

| 5,636,510 A | * | 6/1997 | Beer | .................. F23R 3/14 60/39.23 |
|---|---|---|---|---|
| 10,066,511 B2 | | 9/2018 | Heid et al. | |

(Continued)

FOREIGN PATENT DOCUMENTS

| EP | 3220050 A1 | 9/2017 |
|---|---|---|
| EP | 3154904 B1 | 9/2018 |

(Continued)

OTHER PUBLICATIONS

Ditaranto et al., Experimental Study on High Pressure Combustion of Decomposed Ammonia: How Can Ammonia Be Best Used in a Gas Turbine?, GT2021-60057, The American Society of Mechanical Engineers, Proceedings of ASME Turbo Expo 2021, Turbomachinery Technical Conference and Exposition, June Jul. 11, 2021, 8 Pages. https://doi.org/10.1115/GT2021-60057.

(Continued)

*Primary Examiner* — Arun Goyal
(74) *Attorney, Agent, or Firm* — Dority & Manning, P.A.

(57) ABSTRACT

A method includes delivering fuel and a first portion of oxidant as a rich mixture to the first zone of the combustion chamber. The fuel includes ammonia ($NH_3$). The method further includes burning the rich mixture in the first zone. Combustion gases containing nitrogen oxides (NOx) are produced. The method further includes delivering a second portion of oxidant into the second zone to break down unburned ammonia into ammonia intermediates in the second zone. The nitrogen oxides (NOx) are consumed by reacting with the ammonia intermediates in the second zone. Byproduct hydrogen is produced as a result of breaking down the unburned ammonia into the ammonia intermediates. The method further includes delivering a third portion of oxidant into the third zone. The byproduct hydrogen is burned in the third zone. The third portion of oxidant is (Continued)

greater than the first portion of oxidant and the second portion of oxidant.

21 Claims, 5 Drawing Sheets

(51) Int. Cl.
  *F02C 3/30* (2006.01)
  *F23R 3/36* (2006.01)
(52) U.S. Cl.
  CPC .............. *F05D 2240/35* (2013.01); *F23R 2900/00004* (2013.01)

(56) References Cited

U.S. PATENT DOCUMENTS

| | | | |
|---|---|---|---|
| 10,301,725 | B2 | 5/2019 | Hughes |
| 10,487,407 | B2 | 11/2019 | Timothy et al. |
| 10,753,276 | B2 | 8/2020 | Bulat et al. |
| 10,767,556 | B2 | 9/2020 | Bulat et al. |
| 10,767,855 | B2 | 9/2020 | Bulat et al. |
| 2020/0277894 | A1 | 9/2020 | Heid et al. |
| 2021/0071870 | A1 | 3/2021 | Bulat |
| 2023/0094065 | A1* | 3/2023 | Yoshida ............ F02C 7/222 60/734 |

FOREIGN PATENT DOCUMENTS

| | | | |
|---|---|---|---|
| JP | 5935124 | B2 | 6/2016 |
| JP | 2017180266 | A * | 10/2017 |
| JP | 2017180303 | A * | 10/2017 |
| JP | 2019015179 | A * | 1/2019 |
| WO | WO2015192876 | A1 | 12/2015 |
| WO | WO2019088107 | A1 | 5/2019 |
| WO | WO2020111114 | A1 | 6/2020 |

OTHER PUBLICATIONS

Glarborg et al., Modeling Nitrogen Chemistry in Combustion, Progress in Energy and Combustion Science, vol. 67, 2018, pp. 31-38. (Abstract Only) https://www.researchgate.net/publication/326099542_Modeling_nitrogen_chemistry_in_combustion.

Grannell et al., A Comparison of Combustion Promoters for Ammonia and Two Ways to Run Engines on Ammonia as the Only Fuel, Annual NH3 Fuel Conference, Romulus, MI, Sep. 26-28, 2010, 14 Pages. Retrieved Jan. 3, 2022 from https://nh3fuelassociation.org/wp-content/uploads/2012/05/shawngrannellammoniaconfpres2010.pdf.

Hussein et al., Ammonia-Hydrogen Combustion in a Swirl Burner with Reduction of NOx Emissions, Science Direct, Energy Procedia, vol. 158, 2019, pp. 2305-2310.

Ito et al., Emission Characteristics of a Lean-Premixed Ammonia/Natural-Gas Gas-Turbine Combustor and Effect of Secondary Ammonia Injection, Mechanical Engineering Journal, vol. 6, Issue 6, Sep. 2019. Retrieved Jan. 3, 2022 https://www.researchgate.net/publication/335766688_Emission_characteristics_of_a-lean-premixed_ammonianatural-gas_gas-turbine_combustor_and_effect_of_secondary_ammonia_injection (Abstract Only).

Ito et al., NOx Emission of Two-Stage Combustor for Ammonia/Natural Gas Co-Fired Gas Turbine, 12th Asia-Pacific Conference on Combustion, ASPACC 2019, Fukuoka, Japan, 3 Pages. https://tohoku.pure.elsevier.com/en/publications/nox-emission-of-two-stage-combustor-for-ammonianatural-gas-co-fir (Abstract Only).

Ito et al., A Study of Low NOx Combustion Method for Ammonia/Natural Gas Co-Fired Gas Turbine Using Detailed Chemistry, Journal of the Combustion Society of Japan, vol. 61, No. 198, 2019, pp. 368-375. (Abstract Only) https://www.jstage.jst.go.jp/article/jcombsj/advpub/0/advpub_1905/_article/-char/en.

Kaust, Kaust Research Conference—Near Zero-Carbon Combustion Technology, Jun. 21-23, 2021, 3 Pages. https://ccrc.kaust.edu.sa/events/2021/06/21/default-calendar/CCRC-Conference-2021.

Kobayashi et al., Science and Technology of Ammonia Combustion, Proceedings of the Combustion Institute, vol. 37, Issue 1, Japan, 2019, pp. 109-133. https://www.sciencedirect.com/science/article/pii/S1540748918306345.

Mitsubishi, Mitsubishi Power Commences Development of World's First Ammonia-Fired 40MW Class Turbine System, Jokohama Japan, Mar. 1, 2021, 2 Pages. Retrieved Jan. 3, 2022 from https://power.mhi.com/news/20210301.html.

Wang et al., Numerical Study on the Premixed Oxygen-Enriched Ammonia Combustion, Energy Fuels, vol. 34, Issue 12, Dec. 9, 2020, pp. 16903-16917. https://doi.org/10.1021/acs.energyfuels.0c02777 (Abstract Only).

Xiao and Valera-Medina, Chemical Kinetic Mechanism Study on Premixed Combustion of Ammonia/Hydrogen Fuels for Gas Turbine Use, GTP-16-1553, ASME. J. Eng. Gas Turbines Power, vol. 139, Issue 8, Aug. 2017, 10 Pages. https://doi.org/10.1115/1.4035911 (Abstract Only).

* cited by examiner

AMMONIA FIRED COMBUSTOR OPERATING METHOD

FIELD

The present disclosure relates generally to operating gas turbine combustors on alternate fuels. In particular, the present disclosure relates to methods of operating gas turbine combustors on a fuel mixture containing ammonia ($NH_3$).

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas for traditional systems) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Traditional gas turbine engines include one or more combustors that burn a mixture of natural gas and air within the combustion chamber to generate the high pressure and temperature combustion gases. As a byproduct, nitrogen oxides (NOx) and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Alternate fuels can be used as a substitute (or in addition to) natural gas to reduce the production of NOx in the combustor. However, many alternate fuels have burning characteristics that make them unsuitable for use with traditional combustor operating methods. For example, such characteristics may include flame speed that is too slow/fast, flame temperature that is too hot/cold, and/or unwanted combustion byproducts.

Accordingly, an improved method of operating a combustor that allows for use of alternate fuels, such as ammonia ($NH_3$) is desired and would be appreciated in the art.

BRIEF DESCRIPTION

Aspects and advantages of the methods in accordance with the present disclosure will be set forth in part in the following description, or may be obvious from the description, or may be learned through practice of the technology.

In accordance with one embodiment, a method of operating a combustor of a gas turbine is provided. The combustor includes a combustion liner that defines a combustion chamber. The combustion chamber includes, in a serial flow order, a first zone, a second zone, and a third zone. The method includes delivering fuel and a first portion of oxidant as a rich mixture to the first zone of the combustion chamber with one or more fuel nozzles disposed at a forward end of the combustor. The fuel includes ammonia ($NH_3$). The method further includes burning the rich mixture in the first zone. As a result, combustion gases containing nitrogen oxides (NOx) are produced. The method further includes delivering a second portion of oxidant into the second zone to break down unburned ammonia into ammonia intermediates in the second zone. As a result, the nitrogen oxides (NOx) are consumed by reacting with the ammonia intermediates in the second zone. Byproduct hydrogen is produced as a result of breaking down the unburned ammonia into the ammonia intermediates. The method further includes delivering a third portion of oxidant into the third zone. The byproduct hydrogen is burned in the third zone. The third portion of oxidant is greater than the first portion of oxidant and the second portion of oxidant.

In accordance with another embodiment, a method of operating a combustor of a gas turbine is provided. The combustor includes a combustion liner that defines a combustion chamber. The combustion chamber includes, in a serial flow order, a first zone, a second zone, and a third zone. The method includes delivering fuel and a first portion of oxidant as a rich mixture to the first zone of the combustion chamber with one or more fuel nozzles disposed at a forward end of the combustor. The fuel includes ammonia ($NH_3$). The method further includes burning at least a portion of the rich mixture in the first zone. As a result, combustion gases containing nitrogen oxides (NOx) are produced and conveyed through the first zone over a first time period. The method further includes conveying the combustion gases and unburned ammonia through the second zone over a second time period while delivering a second portion of oxidant into the second zone to break down the unburned ammonia into ammonia intermediates in the second zone. As a result, the nitrogen oxides in the combustion gases are consumed by reacting with the ammonia intermediates in the second zone. The method further includes delivering a third portion of oxidant into the third zone while conveying the combustion gases through the third zone over a third time period. The third portion of oxidant is greater than the first portion of oxidant and the second portion of oxidant, and the second time period is greater than the first time period and the third time period.

In accordance with another embodiment, a combustor is provided. The combustor includes a liner that defines a combustion chamber that extends between an inlet and an outlet. The combustion chamber includes, in a serial flow order, a first zone, a second zone, and a third zone. The combustor further includes at least one fuel nozzle that is configured to inject a mixture of fuel and a first portion of oxidant in the first zone. The fuel includes ammonia ($NH_3$). The first portion of oxidant is between about 7% and about 15% of total oxidant added to the combustor. The combustor further includes at least two oxidant injection stages in the second zone. The at least two oxidant injection stages in the second zone are configured to inject a second portion of oxidant that is between about between about 7% and about 15% of the total oxidant added to the combustor. The combustor further includes at least two oxidant injection stages in the third zone. The at least two oxidant injection stages in the third zone are configured to inject a third portion of oxidant having between about between about 70% and about 95% of the total oxidant added to the combustor.

These and other features, aspects and advantages of the present methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods, including the best mode of making and using the present systems and methods, directed to one of ordinary skill in the art, is set forth in the specification, which makes reference to the appended figures, in which.

DETAILED DESCRIPTION

Figure 1:
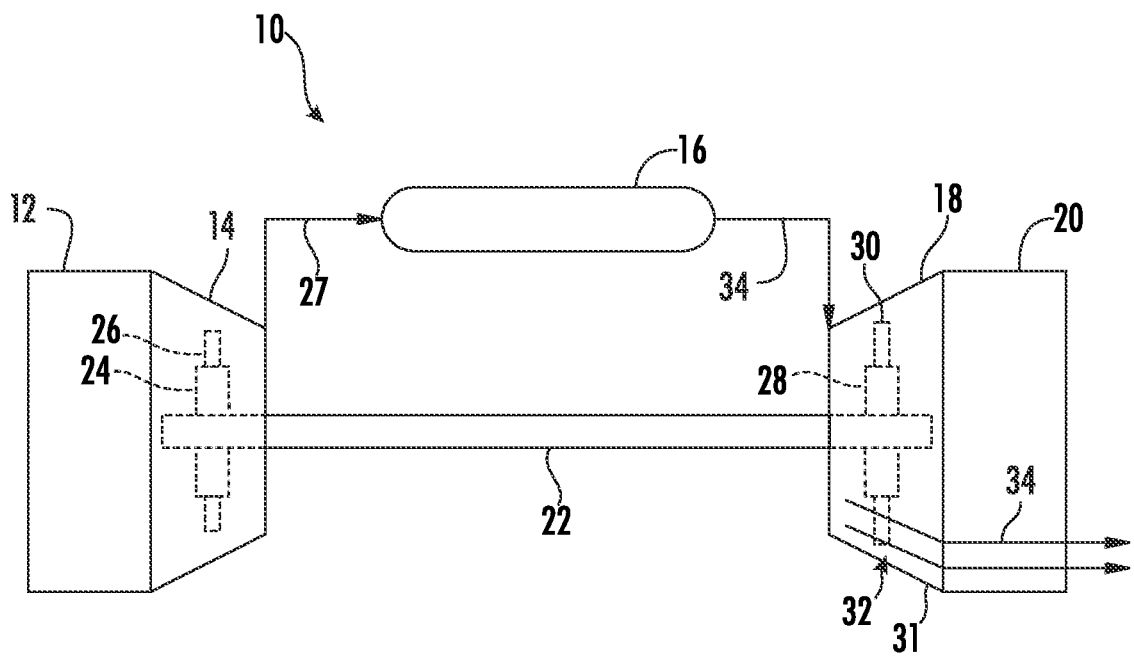
FIG. 1 is a schematic illustration of a turbomachine in accordance with embodiments of the present disclosure.

Reference now will be made in detail to embodiments of the present methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive- or. For example, a condition A or B is satisfied by any one of the following: A is true Or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the swirler assemblies as described herein may be used in any type of turbomachine including, but not limited to, a steam turbine, an aircraft gas turbine, or a marine gas turbine.

Figure 2:
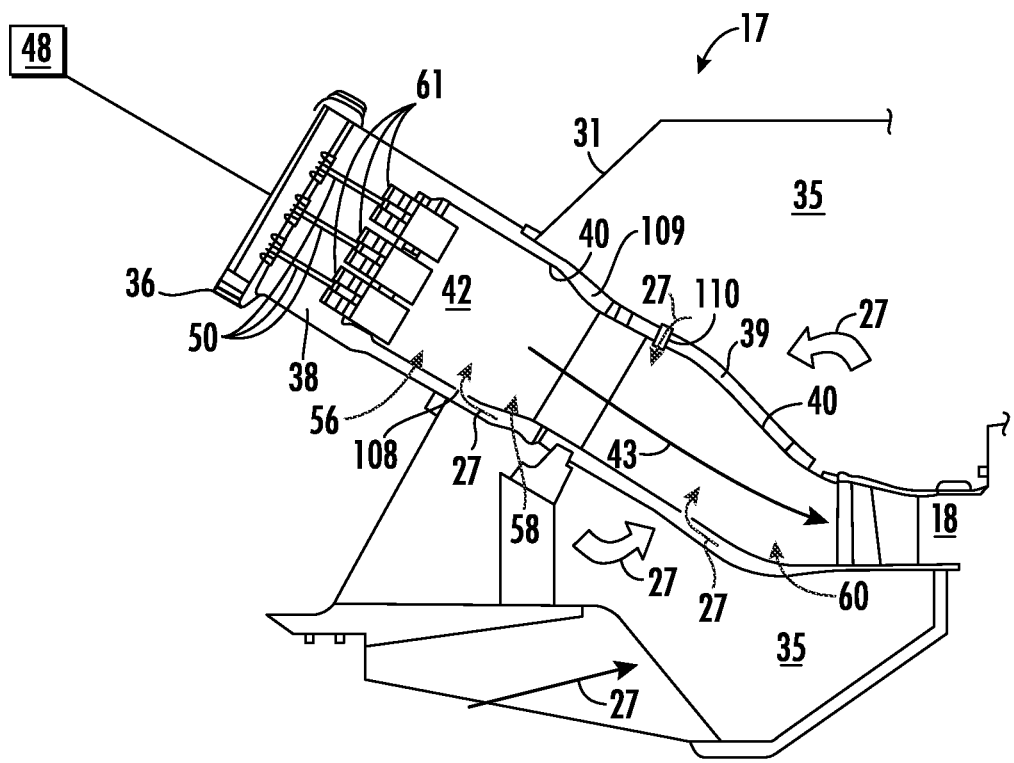
FIG. 2 illustrates a cross-sectional view of a combustor in accordance with embodiments of the present disclosure.

As shown, the gas turbine 10 generally includes an inlet section 12, a compressor section 14 disposed downstream of the inlet section 12, a plurality of combustors 17 (as shown in FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or from a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air 27 to the combustors of the combustor section 16. The pressurized air 27 is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown in FIG. 2, the combustor 17 may be at least partially surrounded by the outer casing 31, which may be referred to as a compressor discharge casing. The outer casing 31 may at least partially define a high pressure plenum 35 that at least partially surrounds various components of the combustor 17. The high pressure plenum 35 may be in fluid communication with the compressor 14 (FIG. 1) to receive the compressed air 27 therefrom. An end cover 36 may be coupled to the outer casing 31. In particular embodiments, the outer casing 31 and the end cover 36 may at least partially define a head end volume or portion 38 of the combustor 17.

In particular embodiments, the head end portion 38 is in fluid communication with the high pressure plenum 35 and/or the compressor 14. A combustion liner 40 may define a combustion chamber 42 for combusting the fuel-air mixture and/or may at least partially define a hot gas path through the combustor as indicated by arrow 43, for directing the combustion gases 34 towards an inlet of the turbine section 18.

In various embodiments, the combustor 17 includes at least one fuel nozzle 61 at the head end portion 38. As shown in FIG. 2, the fuel nozzle 61 may be disposed within the outer casing 31 downstream from and/or spaced from the end cover 36 of the combustor 17 and upstream from the combustion chamber 42. In particular embodiments, the fuel nozzle 61 may be in fluid communication with a fuel supply 48 via one or more fluid conduits 50. In many embodiments, the fluid conduit(s) 50 may be fluidly coupled and/or connected at one end to the end cover 36.

Figure 3:
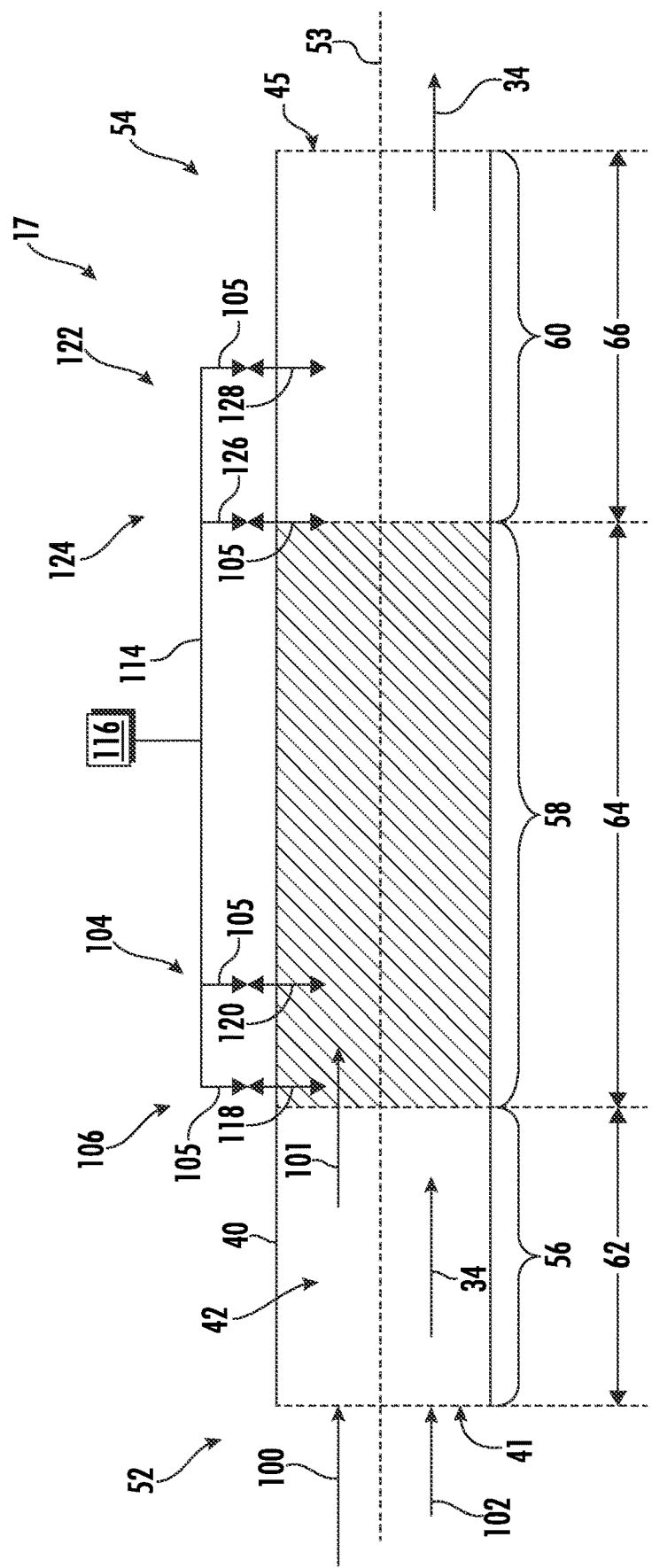
FIG. 3 illustrates a schematic view of a combustor in accordance with embodiments of the present disclosure.

FIG. 3 illustrates a schematic view of a combustor 17 in accordance with embodiments of the present disclosure. As shown, the combustor 17 may include a combustion liner 40 that extends along an axial centerline 53 between a forward end 52 and an aft end 54. The combustion liner 40 may define a combustion chamber 42 that extends between an inlet 41 at the forward end 52 and an outlet 45 at the aft end 54. The inlet 41 of the combustion chamber 42 may receive a mixture of fuel 100 and a first portion of oxidant or air 102 (e.g., from the at least one fuel nozzles 61 shown in FIG. 2). In exemplary embodiments, as described below, the fuel 100 in the mixture may be mostly ammonia (such as approximately 95% ammonia, with the remainder being hydrogen and/or other fuels). The mixture of fuel 100 and the first portion of oxidant 102 may ignite within the combustion chamber 42 to produce combustion gases 34. The combustion gases 34 may then travel through the combustion chamber 42 and be exhausted at the outlet 45 into the turbine section 18.

In some embodiments, the fuel 100 may be 100% ammonia (e.g., "pure ammonia" not mixed with any other fuels). In such embodiments, part of the ammonia will be cracked down to hydrogen and nitrogen. Cracking ammonia can happen by either sending it to an ammonia cracking reactor (external one). For example, the cracking reactor may create hydrogen and nitrogen from the ammonia. Cracking ammonia can also be achieved by thermally dissociating the ammonia within the gas turbine combustor by taking some of the flame zone heat (exchange heat by the hot combustion byproducts and the ammonia inlet stream). The produced hydrogen will be used to stabilize the total fuel stream combustion.

As shown, the combustion chamber 42 may include, in a serial flow order (e.g. along the direction of flow through the combustion chamber 42, along the axial centerline 53 in the direction of flow from the inlet 41 towards the outlet 45, etc.) a first zone 56, a second zone 58, and a third zone 60. The first zone 56 may extend between the inlet 41 and the second zone 58, and the first zone 56 may define a first length 62 along the axial centerline 53. The second zone 58 may extend between the first zone 56 and the third zone 60, and the second zone 58 may define a second length 64 along the axial centerline 53. The third zone 60 may extend between the second zone 58 and the outlet 45, and the third zone 60 may define a third length 66 along the axial centerline 53. In exemplary embodiments, as shown in FIG. 3, the second length 64 may be longer than the first length 62 and the second length 64. Particularly, the second length 64 may be between about 20% and about 80% longer than the first length 62, or such as between about 30% and about 70% longer than the first length 62, or such as between about 40% and about 60% longer than the first length 62. Similarly, the second length 64 may be between about 20% and about 80% longer than the third length 66, such as between about 30% and about 70% longer than the third length 66, or such as between about 40% and about 60% longer than the third length 66. The longer second length 64 advantageously allows for increased NOx reduction and ammonia breakdown, which results in cleaner more efficient operation of the overall gas turbine 10. In other embodiments, the third length 66 may be longer than the second length 64, such as such as between about 10% and about 80% longer than the second length 64, or such as between about 20% and about 70% longer than the second length 64, or such as between about 30% and about 60% longer than the second length 64.

The first zone 56 may be referred to as the "flame zone" because it is the region in which the mixture of fuel 100 and the first portion of oxidant 102 is initially ignited. However, it should be noted that not all of the fuel 100 in the mixture is burned in the first zone 56. For example, as discussed below, only a portion of the fuel 100 ignites in the first zone 56, which produces combustion gases including nitrogen oxides (NOx), and which leaves a portion of unburned fuel 101. The combustion gases (which include NOx) and the unburned fuel 101 travel together through the first zone 56 and into the second zone 58.

Particularly, the mixture of fuel 100 and the first portion of oxidant 102 may be injected into the first zone 56 (e.g., by the fuel nozzles 61) as a rich mixture. As used herein, "rich mixture" may refer to a fuel/air or fuel/oxidant mixture having an equivalence ratio (Φ) greater than 1, and "lean mixture" may refer to a fuel/air mixture having an equivalence ratio (Φ) less than 1. A rich mixture may have insufficient oxidants (e.g., air) to form a complete combustion, while a lean mixture may have excess oxidants (e.g., air). As used herein, the equivalence ratio (Φ) is defined as the ratio of the fuel-to-air ratio (or actual ratio) and the stoichiometric fuel-to-air ratio (or theoretical ratio). Mathematically, the equivalence ratio may be calculated as follows:

$$\Phi = \frac{m_{fuel}/m_{air}}{\left(m_{fuel}/m_{air}\right)_{st}}$$

where, m represents the mass and the suffix st stands for stoichiometric conditions.

In the second zone 58, a controlled depletion of NOx may be achieved by introducing a second portion of oxidant or air 104 (e.g., approximately 5%-15% of the total oxidant) may be introduced over a long distance and time period (e.g., between about 6 ms and about 12 ms). For example, the second portion of oxidant 104 may be introduced into the second zone 58 in at least two zone-two oxidant injection stages 106. The at least two zone-two oxidant injection stages 106 may be axially spaced apart form one another. In particular embodiments, the at least two oxidant injection stages 106 may be injected radially into the second zone 58. For example, this may be via holes 108 in the combustion liner 40 (FIG. 2), such that the air is pulled from an annulus 109 defined between the combustion liner 40 and a flow sleeve 39 that is spaced apart from and surrounds the combustion liner 40. Alternatively or additionally, one or more air nozzles 110 may extend through the flow sleeve 39, the annulus 109, and the combustion liner 40 to provide for direct fluid communication between the second zone 58 and the high pressure plenum 35. Although FIG. 3 illustrates two zone-two oxidant injection stages 106, the combustor may include any number of zone-two oxidant injection stages 106 and should not be limited to any particular number of zone-two oxidant injection stages 106 unless specifically recited in the claims.

In various embodiments, the at least two zone-two oxidant injection stages 106 may be disposed closer (e.g., axially closer) to the inlet 41 of the combustion chamber 42 than the outlet 45 of the combustion chamber 42. For example, the at least two zone-two oxidant injection stages 106 may be disposed closer to the inlet of the second zone 58 than the outlet of the second zone 58 (e.g., closer to the first zone 56 than the third zone 60). The at least two zone-two oxidant injection stages 106 may include a first oxidant injection stage 118 and a second oxidant injection stage 120. The first oxidant injection stage 118 may be disposed at (or proximate) the inlet of the second zone 58, and the second oxidant injection stage 120 may be disposed downstream of the first oxidant injection stage 118 with respect to the flow of combustion gases 34.

In the third zone 60, which may be referred to as the "quenching zone" or "dilution zone," the combustion gases 34 may be quenched or diluted by introducing a third portion of oxidant or air 122 to reduce a temperature of the combustion gas 34 and completely burn the remaining fuel, thereby reducing the formation of NOx. For example, the third portion of oxidant 122 may be introduced into the third zone 60 in at least two zone-three oxidant injection stages 124. The at least two zone-three oxidant injection stages 124 may be axially spaced apart from one another. In particular embodiments, the at least two zone-three oxidant injection stages 124 may be injected radially into the second zone 58. Although FIG. 3 illustrates two zone-three oxidant injection stages 124, the combustor may include any number of zone-three oxidant injection stages 124 and should not be limited to any particular number of zone-three oxidant injection stages 124 unless specifically recited in the claims.

In various embodiments, the at least two zone-three oxidant injection stages 124 may be disposed closer to the outlet 45 of the combustion chamber 42 than the inlet 41 of the combustion chamber 42. Particularly, the at least two zone-three oxidant injection stages 124 may be disposed closer to the inlet of the third zone 60 than the outlet of the third zone 60 (e.g., closer to the second zone 58 than the outlet 45 of the combustion chamber 42). The at least two zone three oxidant injection stages 124 may include a first oxidant injection stage 126 and a second oxidant injection stage 128. The first oxidant injection stage 126 may be disposed at (or proximate) the inlet of the third zone 60, and the second oxidant injection stage 128 may be disposed downstream of the first oxidant injection stage 126 with respect to the flow of combustion gases 34.

As shown in FIG. 3, the air or oxidant for the at least two zone-two oxidant injection stages 106 and the at least two zone three oxidant injection stages 124 may be supplied via one or more oxidant or air lines 114 (such as a hose, pipe, or other fluid conduit) fluidly coupled to an oxidant or air supply 116. One or more valves 105 may be disposed in fluid communication on each injection stage. The one or more valves 105 may be selectively actuated between an open position and a closed position to control when oxidant is injected into the combustion chamber 42.

As used herein, the "total air" or "total oxidant" is all of the air or oxidant being injected into the combustion chamber 42 of the combustor 17 over a specific time period. For example, the total air is all of the air (such as 100% of the air) injected or introduced into the combustion chamber 42 over a specified time period (or in a specific instance in time). For example, various amounts of air may be injected into the combustion chamber 42 of the combustor 17 at various locations during the period of time (or specific instance in time), and the total air may be the sum of all the air injected into the combustion chamber 42 of the combustor 17 during the period of time (or specific instance in time).

As used herein, "residence time" may refer to a period of time in which a particle (or group of particles) is present within the combustion chamber 42 (or a specific portion of the combustion chamber 42, such as the first/second/third zones). Because the particles in the combustion chamber 42 travel from the inlet 41 of the combustion chamber 42 to the outlet 45, the "residence time" may be the period of time it takes for the particles to travel through the combustion chamber 42 (or a specific portion of the combustion chamber, such as the first/second/third zones).

Figure 4:
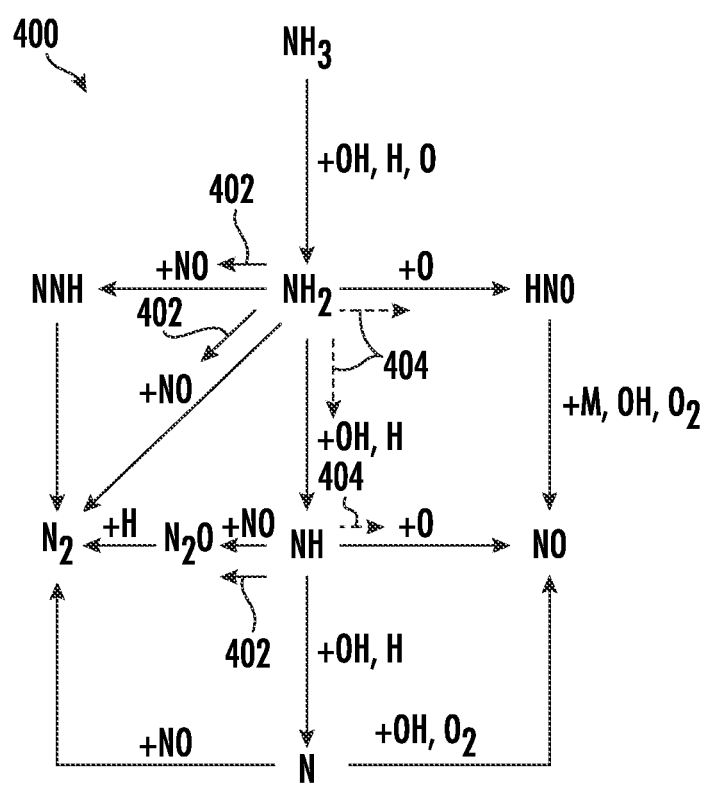
FIG. 4 illustrates a diagram of an ammonia ($NH_3$) combustion mechanistic pathway in accordance with embodiments of the present disclosure.

FIG. 4 illustrates a diagram 400 of an ammonia ($NH_3$) combustion mechanistic pathways, in accordance with an exemplary aspect of the present disclosure. In other words, diagram 400 illustrates how ammonia ($NH_3$) breaks down in a combustion process depending on the amount of oxidants (i.e., air) present. The reduction of ammonia ($NH_3$) during a combustion process may depend on the amount of oxidants. For example, the reduction of ammonia ($NH_3$) may follow the solid arrows 402 when in combustion environments having insufficient of oxidants (e.g., in rich mixtures having an equivalence ratio greater than 1), and the reduction of ammonia ($NH_3$) may follow the dashed arrows 404 when in combustion environments having an abundance of oxidants (e.g., in lean mixtures having an equivalence ratio less than 1).

Particularly, as shown by following arrows 404, in combustion environments having an abundance of oxidants, ammonia ($NH_3$) may reduce to NOx. By contrast, as shown by following arrows 402, in combustion environments having insufficient oxidants (i.e., a rich mixture), ammonia ($NH_3$) may reduce to diatomic nitrogen ($N_2$) via the consumption of NOx. Referring back to FIG. 3 briefly, ammonia ($NH_3$) may be injected as the fuel in the first zone 56 to create a stable flame. Particularly, ammonia in first zone 56 of the combustion chamber may intentionally and advantageously be burned under rich mixture conditions, e.g., rich enough to burn the least amount of ammonia while maintaining a stable flame. In this way, a portion of the ammonia exiting the first zone 56 is unburned an enters the second zone 58.

In the second zone 58, the unburned ammonia may be introduced to small amounts of oxidants (e.g., the second portion of oxidant 104) which may trigger the ammonia to break down according to the arrows 402. This advantageously promotes the consumption of NOx in the second zone 58 while simultaneously producing hydrogen as a byproduct.

In the third zone 60, which may begin once all the ammonia is consumed, such that there is advantageously no risk of reactions occurring according to the arrows 404, an abundance of oxidant or air may be added quench the reaction, control the temperature, and burn the remaining fuel (which is typically the hydrogen formed as a byproduct of burning ammonia rich in the second zone 58). Additionally, because the temperature products in the third zone 60 drops due to the abundance of air, NOx formation during hydrogen combustion is significantly minimized as combustion occurs at temperature below the thermal NOx formation temperature.

In exemplary embodiments, the ammonia may be fully consumed upon entering the third zone 60. Additionally, the third portion of oxidant 122 may reduce a temperature of the combustion gases within the third zone 60 below a thermal NOx formation temperature. In other words, at the outlet of the second zone 58 or inlet of the third zone 60, all the ammonia is consumed either by oxidation or by decomposing into hydrogen. For example, in the first zone 56, a fuel/air mixture is burned rich first to have stable flame. The fuel/air mixture is burned as rich as possible but is bound by not going too rich beyond flame stability. In the second zone 58, small amounts of oxidant or air is introduced in stages to breakdown ammonia in the presence of NOx which will be consumed. Once the ammonia is completely consumed, either by oxidation or by decomposing the ammonia to hydrogen, a large amount of air is introduced in the third zone 60, which will also help taking the total mixture below thermal NOx formation, while burning the remaining hydrogen.

Figure 5:
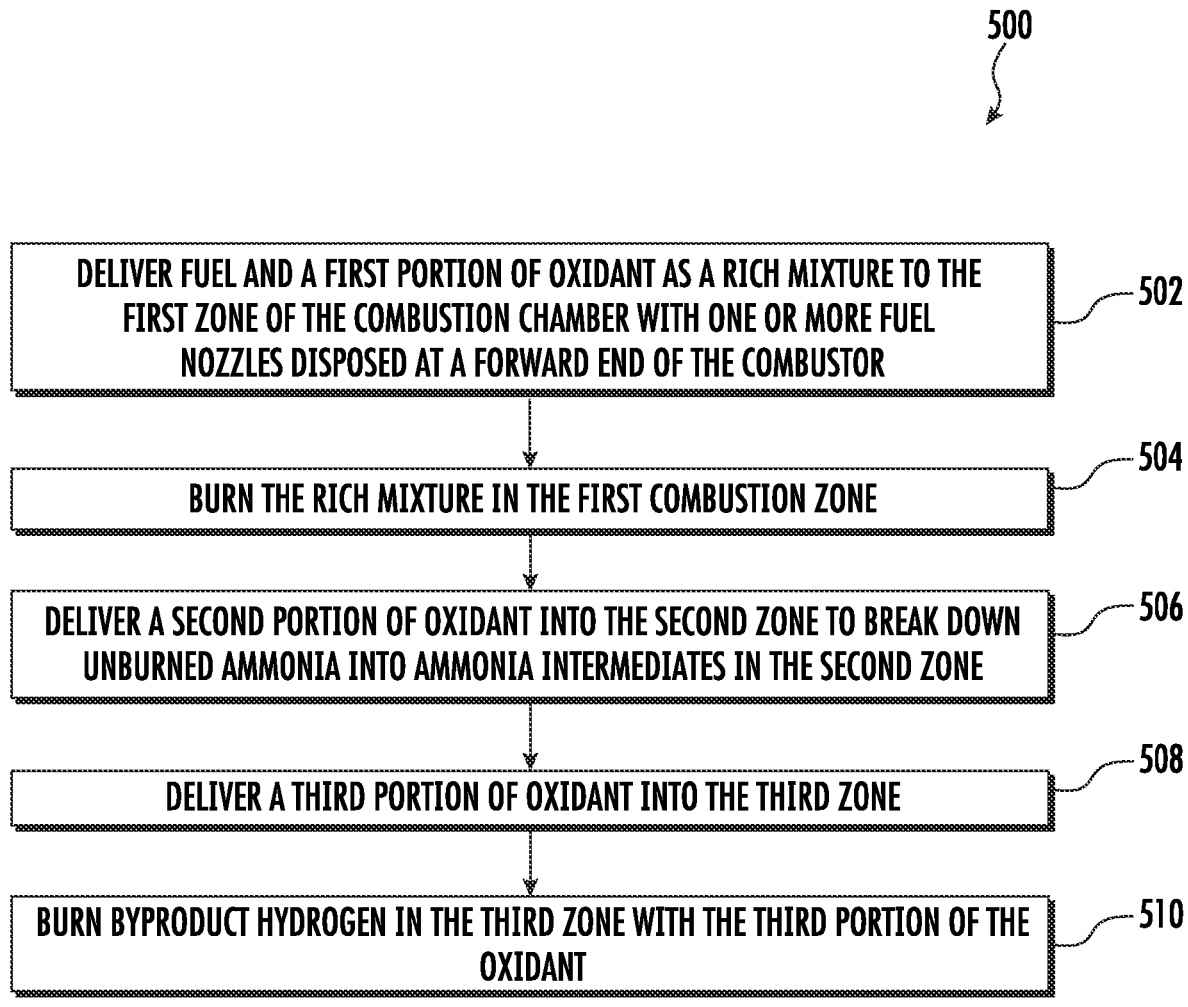
FIG. 5 illustrates a flow chart of a method of operating a combustor in accordance with embodiments of the present disclosure.

Referring now to FIG. 5, a flow diagram of one embodiment of a method 500 of operating a combustor of a gas turbine is illustrated in accordance with aspects of the present subject matter. In general, the method 500 will be described herein with reference to the gas turbine 10, the combustor 17, and the combustion chamber 42 described above with reference to FIGS. 1-3. However, it will be appreciated by those of ordinary skill in the art that the disclosed method 500 may generally be utilized with any suitable turbomachine and/or may be utilized in connection with a system having any other suitable system configuration. In addition, although FIG. 5 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

The combustor 17 according to the method 500 may include a combustion liner 40 that defines a combustion chamber 42. The combustion chamber 42 may include, in a serial flow order a first zone 56, a second zone 58, and a third zone 60. The method 500 may include an initial step 502 of delivering fuel 100 and a first portion of oxidant 102 as a rich mixture to the first zone 56 of the combustion chamber 42 with one or more fuel nozzles 61 disposed at a forward end 52 of the combustor 17.

In exemplary embodiments, the fuel 100 may include ammonia ($NH_3$). Particularly, the fuel 100 may be a fuel mixture containing ammonia ($NH_3$) mixed with hydrogen. In various embodiments, the fuel mixture may be mostly ammonia ($NH_3$) mixed with small amounts of hydrogen. For example, the fuel mixture may contain between about 80% and about 99% ammonia ($NH_3$) by volume, or such as between about 90% and about 99% ammonia ($NH_3$) by volume, or such as between about 93% and about 98% ammonia ($NH_3$) by volume, or such as about 95% ammonia ($NH_3$) by volume. The remainder of the mixture may be hydrogen. For example, the fuel mixture may include about 1% and about 20% hydrogen, or such as between about 1% and about 10% hydrogen, or such as between about 3% and about 8% hydrogen, or such as about 5% hydrogen. Because ammonia ($NH_3$) has a low flame speed as compared to traditional fuel sources (such as natural gas), and hydrogen has a very high flame speed as compared to traditional fuel sources, mixing a small amount of hydrogen with the ammonia ($NH_3$) may advantageously increase the flame speed, which enables the ammonia ($NH_3$) to be used in a gas turbine combustor without causing potential flame holding issues.

In exemplary implementations, the rich mixture of fuel 100 and the first portion of oxidant 102 may have an equivalence ratio of between about 1.05 and about 2, or such as between about 1.1 and about 1.9, or such as between about 1.2 and about 1.8, or such as between about 1.3 and about 1.7, or such as between about 1.35 and about 1.65, or such as between about 1.4 and about 1.6, or such as between about 1.45 and about 1.55, or such as about 1.5.

Additionally, in various implementations, the first portion of oxidant 102 may be air enriched with oxygen. For example, the first portion of oxidant 102 may be air that includes higher amounts of oxygen than are normally in the atmosphere (which usually contains about 21% oxygen by volume, about 78% nitrogen by volume, and about 1% other gases by volume). In this way, the first portion of oxidant 102 may be air enriched with oxygen such that a volume percent of oxygen in the air is greater than 21%. Particularly, the first portion of oxidant 102 may air be enriched with oxygen such that a volume percent of oxygen is between about 21% and about 30%, or such as between about 22% and 30%, or such as between about 26% and about 29%, or such as about 27%. The remainder of the air may include nitrogen (N2).

The method 500 may further include a step 504 of burning the rich mixture in the first zone 56. As a result, combustion gases 34 containing nitrogen oxides (NOx) are produced within the first zone 56. Particularly, the combustion gases 34 resulting from the rich mixture may include nitrogen oxides (NOx) from the burned ammonia (NH3) and may include unburned fuel 101 or ammonia (NH3) due to the lack of oxidants in the first zone 56, such that the combustion gases 34 exiting the first zone 56 (or entering the second zone 58) still contain unburned fuel 101 (i.e., unburned ammonia).

As shown in FIG. 5, the method 500 may further include a step 506 delivering a second portion of oxidant or air 104 into the second zone 58 to break down the unburned ammonia ($NH_3$) into ammonia intermediates in the second zone 58. As a result, the nitrogen oxides (NOx) may be consumed by reacting with ammonia intermediates in the second zone 58. An intermediate is a molecular entity that is formed from the reactants and reacts further to give the directly observed products of a chemical reaction. Stated otherwise, an intermediate is transient species within a multi-step reaction mechanism that is produced in the preceding step and consumed in a subsequent step to ultimately generate the final reaction product. As shown in FIG. 4, the intermediates of ammonia ($NH_3$) in a burning reaction having insufficient oxidants are $NH_2$, NNH, NH, $N_2O$, and N. It should be appreciated that the combustion gases 34 and the unburned ammonia ($NH_3$) traveling through the second zone 58 is intentionally and advantageously mixed with insufficient amounts of oxidants, thereby causing the unburned ammonia ($NH_3$) to follow the solid arrow 402 path shown in FIG. 4, which results in NOx being consumed by the ammonia intermediates.

The method 500 may further include at a step 508 of delivering a third portion of oxidant or air 122 into the third zone 60. As shown in FIG. 3, the first portion of oxidant 102 may be injected into the first zone 56 by the fuel nozzle 61, the second portion of oxidant 104 may be injected into the second zone 58 by the at least two zone-two oxidant injection stages 106, and the third portion of oxidant 122 may be injected into the third zone 60 by the at least two zone-three oxidant injection stages 124. In exemplary embodiments, the method 500 may further include a step 510 of burning the byproduct hydrogen in the third zone with the third portion of the oxidant.

In exemplary implementations, the third portion of oxidant 122 may be greater than each of the first portion of oxidant 102 and the second portion of oxidant 104. For example, the third portion of oxidant 122 may be greater than (or equal to) a sum of the first portion of oxidant 102 and the second portion of oxidant 104 with respect to the total oxidant injected into the combustion chamber 42. In this way, a majority (e.g., greater than 50%, or greater than 60% in some implementations, or greater than 70% in other implementations, or such as greater than 80% in particular implementations) of the total oxidant may be injected at the third zone 60. In various embodiments, delivering the first portion of oxidant at step 502 may further include delivering between about 7% and about 15% of total oxidant added to the combustor (or such as between about 8% and about 14%, or such as between about 9% and about 13%). Additionally, delivering the second portion of oxidant at step 506 may include delivering between about 7% and about 15% of the total oxidant added to the combustor (or such as between about 8% and about 14%, or such as between about 9% and about 13%). Lastly, delivering the third portion of oxidant at step 508 may include delivering a remainder of the total oxidant added to the third zone.

In many implementations, the first portion of oxidant 102 may be mixed with the fuel 100 (e.g., within the fuel nozzles 61) and injected at the inlet 41 of the combustion chamber 42 by the fuel nozzles 61. In some implementations, the first portion of oxidant 102 may between about 7% and about 15% of total oxidant added to the combustion chamber 42 of the combustor 17. In other implementations, the first portion of oxidant 102 may between about 9% and about 13% of the total oxidant added to the combustion chamber 42 of the combustor 17. In certain implementations, the first portion of oxidant 102 may between about 10% and about 12% of the total oxidant added to the combustion chamber 42 of the combustor 17. In particular implementations, the first portion of oxidant 102 may about 11% of the total oxidant added to the combustion chamber 42 of the combustor 17.

In many implementations, the second portion of oxidant 104 may be injected into the second zone 58 of the combustion chamber 42 via the at least two zone-two oxidant injection stages 106. In this way, the below ranges may be divided into parts depending on the number of zone-two oxidant injection stages 106. In some implementations, the second portion of oxidant 104 may be between about 7% and about 15% of the total oxidant added to the combustion chamber 42 of the combustor 17. For example, in such implementations, the first oxidant injection stage 118 may inject between about 3% and about 7% of the total oxidant into the combustion chamber 42, and the second oxidant injection stage 120 may inject between about 3% and about 7% of the total into the combustion chamber 42. In other implementations, the second portion of oxidant 104 may be between about 9% and about 13% of the total oxidant added to the combustion chamber 42 of the combustor 17. For example, in such implementations, the first oxidant injection stage 118 may inject between about 4.5% and about 6.5% of the total oxidant into the combustion chamber 42, and the second oxidant injection stage 120 may inject between about 4.5% and about 6.5% of the total into the combustion chamber 42. In particular implementations, the second portion of oxidant 104 may be about 11% of the total oxidant added to the combustion chamber 42 of the combustor 17. For example, in such implementations, the first oxidant injection stage 118 may inject between about 5% of the total oxidant into the combustion chamber 42, and the second oxidant injection stage 120 may inject between about 6% of the total into the combustion chamber 42. That is, the second oxidant injection stage 120 may inject slightly more (e.g., 1% or 2% more) of the total oxidant than the first oxidant injection stage 118.

In many implementations, the third portion of oxidant 122 may be injected into the third zone 60 of the combustion chamber 42 via the at least two zone-three oxidant injection stages 124. In this way, the below ranges may be divided into parts depending on the number of zone-three oxidant injection stages 124. In exemplary implementations the remainder of the total oxidant may be injected into the third zone by the at least two zone-three oxidant injection stages 124. For example, if 20% of the total air is injected into the combustion chamber 42 by the fuel nozzles and the zone-two oxidant injection stages 106, then 80% of the total air may be injected into the combustion chamber 42 by the zone-three oxidant injection stages 124.

In some implementations, the third portion of oxidant 122 may be between about 70% and about 95% of the total oxidant added to the combustion chamber 42 of the combustor 17. For example, in such implementations, the first oxidant injection stage 126 may inject between about 45% and about 60% of the total oxidant into the combustion chamber 42, and the second oxidant injection stage 128 may inject between about 25% and about 35% of the total into the combustion chamber 42. In other implementations, the third portion of oxidant 122 may be between about 70% and about 90% of the total oxidant added to the combustion chamber 42 of the combustor 17. For example, in such implementations, the first oxidant injection stage 126 may inject between about 45% and about 55% of the total oxidant into the combustion chamber 42, and the second oxidant injection stage 128 may inject between about 25% and about 35% of the total into the combustion chamber 42. In particular implementations, the third portion of oxidant 122 may be about 78% of the total oxidant added to the combustion chamber 42 of the combustor 17. For example, in such implementations, the first oxidant injection stage 126 may inject about 50% of the total oxidant into the combustion chamber 42, and the second oxidant injection stage 128 may inject about 28% of the total oxidant into the combustion chamber 42. That is, the first oxidant injection stage 126 may inject more (e.g., about 25% more) of the total oxidant than the second oxidant injection stage 128.

The above disclosed ranges of the first portion of oxidant 102, the second portion of oxidant 104, and the third portion of oxidant 122 have been proven to decrease the amount NOx in the combustion gases exiting the combustion chamber 42 when compared to other ranges and percentages. For example, the ammonia (fuel) traveling through the combustion chamber 42 may advantageously be fed with insufficient oxygen through the first zone 56 and the second zone 58, which favorably promotes the consumption of NOx, thereby reducing the overall emissions of the gas turbine 10.

In many embodiments, the second zone 58 may be longer than the first zone 56 and the third zone 60. For example, the second zone 58 may be longer axially than both the first zone 56 and the third zone 60, such that the combustion gases 34 traveling through the combustion chamber 42 spend the most time in the second zone 58. In some embodiments, the axial length of the second zone 58 may be greater than 25% (or greater than 30%, or greater than 40%, or greater than 50%, or greater than 60% of the total axial length of the combustion chamber 42, such that the axial length of the second zone 58 is greater than a sum of the first zone 56 axial length and the third zone 60 axial length. In some implementations, the method 500 may further include conveying combustion gases 34 through the second zone 58 in a residence time of between about 6 milliseconds and about 12 milliseconds, or such as between about 7 milliseconds and about 11 milliseconds, or such as between about 8 milliseconds and about 10 milliseconds. In this way, the combustion gases 34, the unburned ammonia, and the NOx produced from the first zone 56 may travel together through the second zone 58 over a long period of time with insufficient oxidants, which advantageously promotes the consumption of NOx, thereby reducing the emissions.

In some embodiments, the length of the second zone 58 may be be equal to the length of third zone 60. In certain embodiments, the second zone 58 may be slightly longer than the third zone 60. In exemplary embodiments, the third zone 60 may be longer than the second zone 58, such as between about 20% and about 60% longer.

Figure 6:
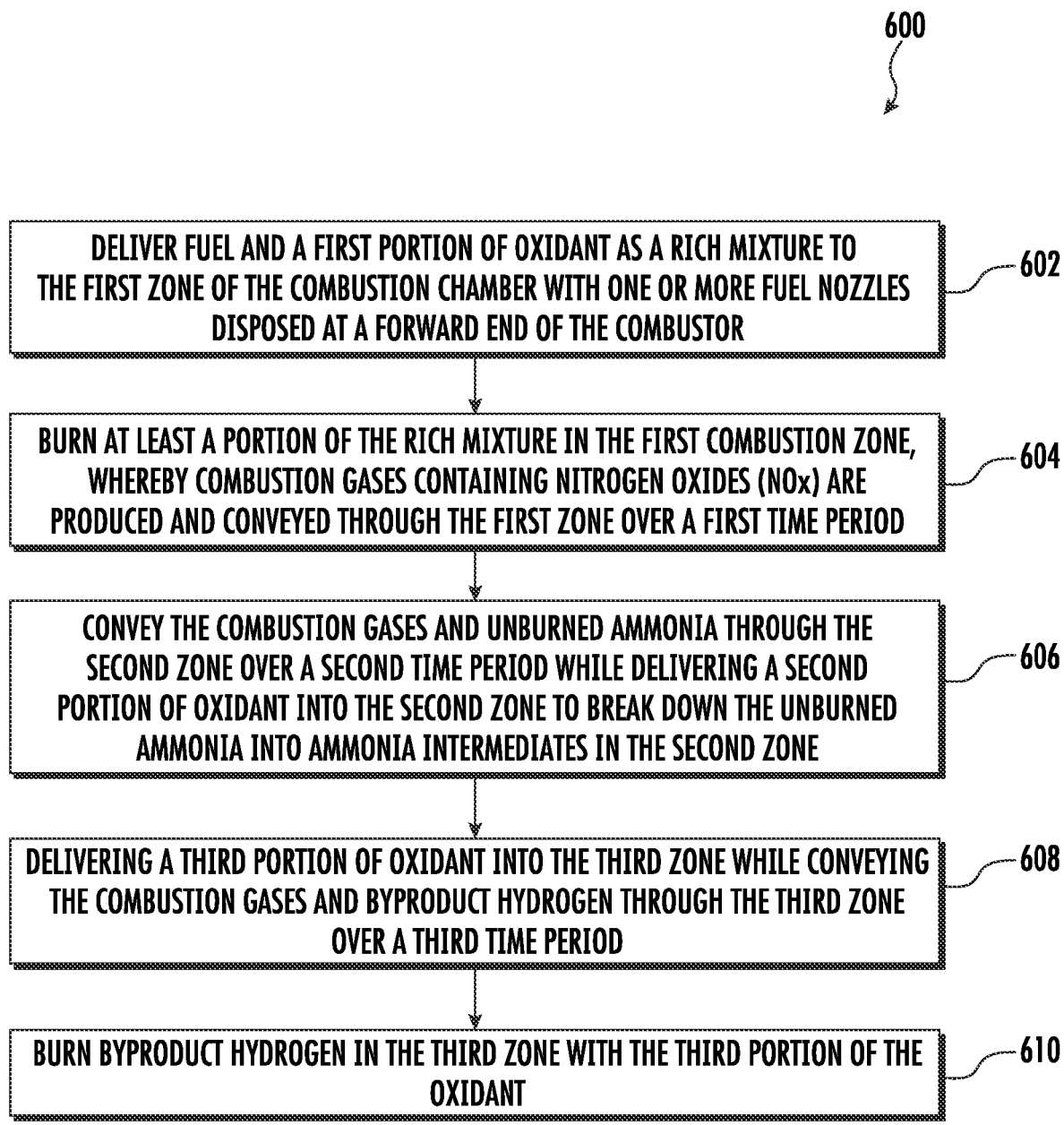
FIG. 6 illustrates a flow chart of a method of operating a combustor in accordance with embodiments of the present disclosure.

Referring now to FIG. 6, a flow diagram of one embodiment of a method 600 of operating a combustor of a gas turbine is illustrated in accordance with aspects of the present subject matter. In general, the method 600 will be described herein with reference to the gas turbine 10, the combustor 17, and the combustion chamber 42 described above with reference to FIGS. 1-3. However, it will be appreciated by those of ordinary skill in the art that the disclosed method 600 may generally be utilized with any suitable turbomachine and/or may be utilized in connection with a system having any other suitable system configuration. In addition, although FIG. 6 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

The combustor 17 according to the method 600 may include a combustion liner 40 that defines a combustion chamber 42. The combustion chamber 42 may include, in a serial flow order a first zone 56, a second zone 58, and a third zone 60. The method 500 may include an initial step 602 of delivering fuel 100 and a first portion of oxidant 102 as a rich mixture to the first zone 56 of the combustion chamber 42 with one or more fuel nozzles 61 disposed at a forward end 52 of the combustor. As discussed above, the fuel may include ammonia ($NH_3$).

Additionally, the method 600 may further include a step 604 of burning at least a portion of the rich mixture in the first zone 56. As a result of step 604, combustion gases 34 containing nitrogen oxides (NOx) are produced and conveyed through the first zone 56 over a first time period. The method 600 may further include a step 606 of conveying the combustion gases 34 and unburned ammonia through the second zone 58 over a second time period while (e.g., simultaneously) delivering a second portion of oxidant 104 into the second zone 58 to break down the unburned ammonia ($NH_3$) into ammonia intermediates in the second zone 58. As a result of step 606, the nitrogen oxides (NOx) in the combustion gases are consumed by reacting with the ammonia intermediates in the second zone 58. Additionally, byproduct hydrogen may be produced in the second zone 58 as a result of breaking down the unburned ammonia into the ammonia intermediates. Particularly, the break down of the unburned ammonia may result in the unburned ammonia being fully consumed upon the combustion gases entering the third zone 60, such that only combustion gases and byproduct hydrogen enter the third zone.

In exemplary implementations, the method 600 may further include a step 608 of delivering a third portion of oxidant 122 into the third zone 60 while (e.g., simultaneously) conveying the combustion gases 34 through the third zone 60 over a third time period. In exemplary embodiments, the method 600 may further include a step 610 of burning the byproduct hydrogen in the third zone with the third portion of the oxidant. For example, upon entering the third zone, the only fuel left in the combustion gases may be the byproduct hydrogen created as a result of breaking down the unburned ammonia into the ammonia intermediates in the second zone. In the third zone 60, which may begin once all the ammonia is consumed, an abundance of oxidant or air may be added to burn the remaining byproduct hydrogen. Additionally, because the temperature in the third zone 60 drops due to the abundance of air, NOx formation during hydrogen combustion is significantly minimized as combustion occurs at temperature below the thermal NOx formation temperature. In exemplary implementations, all of the ammonia may be consumed in the second zone 58, such that the only products entering the third zone are the combustion products 34 and any remaining fuels (which will be mostly the hydrogen created as a byproduct of breaking down the ammonia in the second zone 58). Stated otherwise, the hydrogen created as a byproduct of breaking down the ammonia in the second zone 58 may be conveyed with the combustion gases 34 into the third zone 60, during which the third portion of oxidant 122 may be injected into the third zone 60, thereby providing an oxidant to burn the remaining hydrogen within the third zone 60. Additionally, the third portion of oxidant 122 may advantageously be large enough to drop the temperature of the combustion gases 34 within the third zone 60 such that no thermal NOx is produced as a result of burning the remaining hydrogen. Once the combustion gases 34 reach the third zone 60, all of the ammonia ($NH_3$) may be consumed, which leaves only the remaining fuels (mostly hydrogen) in and the combustion gases 34 in the third zone 60. In other words, by the time the combustion gases 34 are entering the third zone 60, all of the ammonia ($NH_3$) may have been consumed (e.g., by reacting with NOx in the second zone 58), such that the remaining fuels (mostly hydrogen and/or other unconsumed fuels) are consumed in the third zone 60.

In many implementations, the third portion of oxidant may be greater than the first portion of oxidant and the second portion of oxidant (and/or greater than the sum of the first portion of oxidant and the second portion of oxidant). Additionally, the second time period may be greater (i.e., longer) than the first time period and the third time period (and/or greater than the sum of the first time period and the third time period).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of operating a combustor of a gas turbine, the combustor comprising a combustion liner that defines a combustion chamber, the combustion chamber including in a serial flow order a first zone, a second zone, and a third zone, the method comprising: delivering fuel and a first portion of oxidant as a rich mixture to the first zone of the combustion chamber with one or more fuel nozzles disposed at a forward end of the combustor, wherein the fuel comprises ammonia (NH3); burning the rich mixture in the first zone, whereby combustion gases containing nitrogen oxides (NOx) are produced; delivering a second portion of oxidant into the second zone to break down unburned ammonia into ammonia intermediates in the second zone, whereby the nitrogen oxides (NOx) are consumed by reacting with the ammonia intermediates in the second zone, and whereby byproduct hydrogen is produced as a result of breaking down the unburned ammonia into the ammonia intermediates; delivering a third portion of oxidant into the third zone, wherein the third portion of oxidant is greater than each of the first portion of oxidant and the second portion of oxidant; and burning the byproduct hydrogen in the third zone with the third portion of the oxidant.

The method as in one or more of theses clauses, wherein the break down of the unburned ammonia results in the unburned ammonia being fully consumed upon entering the third zone, and wherein delivering the third portion of oxidant reduces a temperature of the combustion gases in the third zone below a thermal NOx formation temperature.

The method as in one or more of theses clauses, wherein delivering the first portion of oxidant comprises delivering between about 7% and about 15% of total oxidant added to the combustor, wherein delivering the second portion of oxidant comprises delivering between about 7% and about 15% of the total oxidant added to the combustor, and wherein delivering the third portion of oxidant comprises delivering a remainder of the total oxidant added to the combustor.

The method as in one or more of theses clauses, wherein the rich mixture comprises an equivalence ratio of between about 1.05 and about 2.

The method as in claim 1, wherein delivering the first portion of oxidant comprises delivering air enriched with oxygen.

The method as in one or more of theses clauses, further comprising conveying the combustion gases through the second zone in a residence time of between about 6 milliseconds and about 12 milliseconds.

The method as in one or more of theses clauses, wherein the fuel is one of pure ammonia or a fuel mixture comprising ammonia mixed with hydrogen.

The method as in one or more of theses clauses, wherein delivering the second portion of oxidant comprises delivering the second portion of oxidant in at least two oxidant injection stages in the second zone, and wherein delivering the third portion of oxidant comprises delivering the third portion of oxidant in at least two oxidant injection stages in the third zone.

The method as in one or more of theses clauses, wherein the at least two oxidant injection stages in the second zone comprise a first oxidant injection stage and a second oxidant injection stage axially spaced from the first oxidant injection stage, wherein the first oxidant injection stage and the second oxidant injection stage each comprise between about 3.5% and about 7% of total oxidant added to the combustor.

The method as in one or more of theses clauses, wherein the at least two oxidant injection stages in the third zone comprise a first oxidant injection stage and a second oxidant injection stage.

A method of operating a combustor of a gas turbine, the combustor comprising a combustion liner that defines a combustion chamber, the combustion chamber including in a serial flow order a first zone, a second zone, and a third zone, the method comprising: delivering fuel and a first portion of oxidant as a rich mixture to the first zone of the combustion chamber with one or more fuel nozzles disposed at a forward end of the combustor, wherein the fuel comprises ammonia ($NH_3$); burning at least a portion of the rich mixture in the first zone, whereby combustion gases containing nitrogen oxides (NOx) are produced and conveyed through the first zone over a first time period; conveying the combustion gases and unburned ammonia through the second zone over a second time period while delivering a second portion of oxidant into the second zone to break down the unburned ammonia into ammonia intermediates in the second zone, whereby the nitrogen oxides in the combustion gases are consumed by reacting with the ammonia intermediates in the second zone, and whereby byproduct hydrogen is produced as a result of breaking down the unburned ammonia into the ammonia intermediates; delivering a third portion of oxidant into the third zone while conveying the combustion gases and the byproduct hydrogen through the third zone over a third time period, wherein the third portion of oxidant is greater than each of the first portion of oxidant and the second portion of oxidant, and wherein the second time period is greater than the first time period and the third time period; and burning the byproduct hydrogen in the third zone with the third portion of the oxidant.

The method as in one or more of theses clauses, wherein the break down of the unburned ammonia results in the unburned ammonia being fully consumed upon entering the third zone, and wherein delivering the third portion of oxidant reduces a temperature of the combustion gases in the third zone below a thermal NOx formation temperature.

The method as in one or more of theses clauses, wherein delivering the first portion of oxidant comprises delivering between about 7% and about 15% of total oxidant added to the combustor, wherein delivering the second portion of oxidant comprises delivering between about 7% and about 15% of the total oxidant added to the combustor, and wherein delivering the third portion of oxidant comprises delivering a remainder of the total oxidant added to the combustor.

The method as in one or more of theses clauses, wherein the rich mixture comprises an equivalence ratio of between about 1.05 and about 2.

The method as in one or more of theses clauses, wherein delivering the first portion of oxidant comprises delivering air enriched with oxygen.

The method as in one or more of theses clauses, further comprising conveying the combustion gases through the second zone in a residence time of between about 6 milliseconds and about 12 milliseconds.

The method as in one or more of theses clauses, wherein the fuel is one of pure ammonia or a fuel mixture comprising ammonia mixed with hydrogen.

The method as in one or more of theses clauses, wherein delivering the second portion of oxidant comprises delivering the second portion of oxidant in at least two oxidant injection stages in the second zone, and wherein delivering the third portion of oxidant comprises delivering the third portion of oxidant in at least two oxidant injection stages in the third zone.

The method as in one or more of theses clauses, wherein the at least two oxidant injection stages in the second zone comprise a first oxidant injection stage and a second oxidant injection stage axially spaced from the first oxidant injection stage, wherein the first oxidant injection stage and the second oxidant injection stage each comprise between about 3.5% and about 7% of total oxidant added to the combustor.

A combustor comprising: a liner defining a combustion chamber extending between an inlet and an outlet, the combustion chamber including in a serial flow order a first zone, a second zone, and a third zone; at least one fuel nozzle configured to inject a mixture of fuel and a first portion of oxidant in the first zone, wherein the fuel comprises ammonia (NH3), and wherein the first portion of oxidant is between about 7% and about 15% of total oxidant added to the combustor; at least two oxidant injection stages in the second zone, the at least two oxidant injection stages in the second zone configured to inject a second portion of oxidant comprising between about between about 7% and about 15% of the total oxidant added to the combustor; and at least two oxidant injection stages in the third zone, the at least two oxidant injection stages in the third zone configured to inject a third portion of oxidant comprising between about between about 70% and about 95% of the total oxidant added to the combustor.

What is claimed is:

1. A method of operating a combustor of a gas turbine, the combustor comprising a combustion liner that defines a combustion chamber, the combustion chamber including in a serial flow order a first zone, a second zone, and a third zone, the method comprising:

delivering a fuel comprising mostly ammonia ($NH_3$) and a first portion of oxidant as a fuel rich mixture to the first zone of the combustion chamber with one or more fuel nozzles disposed at a forward end of the combustor, wherein all of the fuel provided to the combustor is delivered to the first zone, wherein only the fuel comprising mostly ammonia is provided as the fuel to the combustor, and wherein the fuel is defined as a gaseous or liquid product that ignites in the combustion chamber and produces combustion gases comprising nitrogen oxides (NOx);

burning the fuel rich mixture in the first zone, whereby combustion gases containing nitrogen oxides (NOx) are produced;

delivering a second portion of the oxidant into the second zone to break down unburned ammonia into ammonia intermediates in the second zone, whereby the nitrogen oxides (NOx) are consumed by reacting with the ammonia intermediates in the second zone, and whereby byproduct hydrogen is produced as a result of the break down of the unburned ammonia into the ammonia intermediates;

delivering a third portion of the oxidant into the third zone, wherein the third portion of the oxidant is greater than each of the first portion of the oxidant and the second portion of the oxidant, wherein the third zone begins once all of the unburned ammonia is consumed in the second zone such that only the combustion gases, the byproduct hydrogen, and the third portion of the oxidant enter the third zone; and burning the byproduct hydrogen in the third zone with the third portion of the oxidant.

2. The method as in claim 1, wherein the break down of the unburned ammonia results in the unburned ammonia being fully consumed before entering the third zone, and wherein delivering the third portion of the oxidant reduces a temperature of the combustion gases in the third zone below a thermal NOx formation temperature.

3. The method as in claim 1, wherein delivering the first portion of the oxidant comprises delivering between about 7% and about 15% of total oxidant added to the combustor, wherein delivering the second portion of the oxidant comprises delivering between about 7% and about 15% of the total oxidant added to the combustor, and wherein delivering the third portion of the oxidant comprises delivering a remainder of the total oxidant added to the combustor.

4. The method as in claim 1, wherein the fuel rich mixture comprises an equivalence ratio of between about 1.05 and about 2.

5. The method as in claim 1, wherein delivering the first portion of the oxidant comprises delivering air enriched with oxygen.

6. The method as in claim 1, further comprising conveying the combustion gases through the second zone in a residence time of between about 6 milliseconds and about 12 milliseconds.

7. The method as in claim 1, wherein the fuel comprising mostly the ammonia is one of pure ammonia or a fuel mixture comprising the ammonia mixed with hydrogen.

8. The method as in claim 1, wherein delivering the second portion of the oxidant comprises delivering the second portion of the oxidant in at least two first oxidant injection stages in the second zone, and wherein delivering the third portion of the oxidant comprises delivering the third portion of the oxidant in at least two second oxidant injection stages in the third zone.

9. The method as in claim 8, wherein the at least two first oxidant injection stages in the second zone comprise a first oxidant injection stage and a second oxidant injection stage axially spaced from the first oxidant injection stage, wherein the first oxidant injection stage and the second oxidant injection stage each comprise between about 3.5% and about 7% of the total oxidant added to the combustor.

10. The method as in claim 8, wherein the at least two second oxidant injection stages in the third zone comprise a third oxidant injection stage and a fourth oxidant injection stage axially spaced from the third oxidant injection stage; and wherein the at least two second oxidant stages in the third zone are disposed closer to an inlet of the third zone than an outlet of the third zone.

11. The method as in claim 1, further comprising:
depleting the NOx produced from burning the fuel rich mixture by introducing between about 5% and about 15% of the total oxidant added to the second zone of the combustor over a period between about 6 milliseconds (ms) and about 12 ms.

12. A method of operating a combustor of a gas turbine, the combustor comprising a combustion liner that defines a combustion chamber, the combustion chamber including in a serial flow order a first zone, a second zone, and a third zone, the method comprising:
delivering a fuel comprising mostly ammonia ($NH_3$) and a first portion of oxidant as a fuel rich mixture to the first zone of the combustion chamber with one or more fuel nozzles disposed at a forward end of the combustor, wherein all of the fuel provided to the combustor is delivered to the first zone, wherein only the fuel comprising mostly ammonia is provided as the fuel to the combustor such that no other fuels are provided to the combustor in the second zone or the third zone, and wherein the fuel is defined as a gaseous or liquid product that ignites in the combustion chamber and produces combustion gases comprising nitrogen oxides (NOx);
burning at least a portion of the fuel rich mixture in the first zone, whereby combustion gases containing nitrogen oxides (NOx) are produced and conveyed through the first zone over a first time period;
conveying the combustion gases and unburned ammonia through the second zone over a second time period while delivering a second portion of the oxidant into the second zone to break down the unburned ammonia into ammonia intermediates in the second zone, whereby the nitrogen oxides in the combustion gases are consumed by reacting with the ammonia intermediates in the second zone, and whereby byproduct hydrogen is produced as a result of the break down of the unburned ammonia into the ammonia intermediates;
delivering a third portion of the oxidant into the third zone while conveying the combustion gases and the byproduct hydrogen through the third zone over a third time period, wherein the third portion of the oxidant is greater than each of the first portion of the oxidant and the second portion of the oxidant, and wherein the second time period is greater than the first time period and the third time period, wherein the third zone begins once all of the unburned ammonia is consumed in the second zone such that only the combustion gases, the byproduct hydrogen, and the third portion of the oxidant enter the third zone; and
burning the byproduct hydrogen in the third zone with the third portion of the oxidant.

13. The method as in claim 12, wherein the break down of the unburned ammonia results in the unburned ammonia being fully consumed before entering the third zone, and wherein delivering the third portion of the oxidant reduces a temperature of the combustion gases in the third zone below a thermal NOx formation temperature.

14. The method as in claim 12, wherein delivering the first portion of the oxidant comprises delivering between about 7% and about 15% of total oxidant added to the combustor, wherein delivering the second portion of the oxidant comprises delivering between about 7% and about 15% of the total oxidant added to the combustor, and wherein delivering the third portion of the oxidant comprises delivering a remainder of the total oxidant added to the combustor.

15. The method as in claim 12, wherein the fuel rich mixture comprises an equivalence ratio of between about 1.05 and about 2.

16. The method as in claim 12, wherein delivering the first portion of the oxidant comprises delivering air enriched with oxygen.

17. The method as in claim 12, further comprising conveying the combustion gases through the second zone in a residence time of between about 6 milliseconds and about 12 milliseconds.

18. The method as in claim 12, wherein the fuel comprising mostly the ammonia is one of pure ammonia or a fuel mixture comprising the ammonia mixed with hydrogen.

19. The method as in claim 12, wherein delivering the second portion of the oxidant comprises delivering the second portion of the oxidant in at least first two oxidant injection stages in the second zone, and wherein delivering the third portion of the oxidant comprises delivering the third portion of the oxidant in at least second two oxidant injection stages in the third zone.

20. The method as in claim 19, wherein the at least first two oxidant injection stages in the second zone comprise a first oxidant injection stage and a second oxidant injection stage axially spaced from the first oxidant injection stage, wherein the first oxidant injection stage and the second oxidant injection stage each comprise between about 3.5% and about 7% of the total oxidant added to the combustor.

21. A combustor comprising:
a liner defining a combustion chamber extending between an inlet and an outlet, the combustion chamber including in a serial flow order a first zone, a second zone, and a third zone;
at least one fuel nozzle configured to inject a fuel rich mixture of a fuel comprising mostly ammonia ($NH_3$) and a first portion of oxidant in the first zone that produces nitrogen oxides (NOx) after ignition, wherein the first portion of the oxidant is between about 7% and about 15% of total oxidant added to the combustor, and wherein only the fuel comprising mostly ammonia is provided as the fuel to the combustor such that no other fuels are provided to the combustor in the second zone or the third zone, and wherein the fuel is defined as a gaseous or liquid product that ignites in the combustion chamber and produces combustion gases comprising nitrogen oxides (NOx);

at least first two oxidant injection stages in the second zone, the at least first two oxidant injection stages in the second zone configured to inject a second portion of the oxidant comprising between about 7% and about 15% of the total oxidant added to the combustor; and at least second two oxidant injection stages in the third zone, the at least second two oxidant injection stages in the third zone configured to inject a third portion of the oxidant comprising between about 70% and about 86% of the total oxidant added to the combustor, wherein the third zone begins once all unburned ammonia is consumed in the second zone such that only combustion gases, byproduct hydrogen, and the third portion of the oxidant enter the third zone.

* * * * *